(12) United States Patent
Webber

(10) Patent No.: US 10,318,296 B2
(45) Date of Patent: *Jun. 11, 2019

(54) SCHEDULING EXECUTION OF INSTRUCTIONS ON A PROCESSOR HAVING MULTIPLE HARDWARE THREADS WITH DIFFERENT EXECUTION RESOURCES

(71) Applicant: MIPS Tech, LLC, Santa Clara, CA (US)

(72) Inventor: Andrew Webber, Hertfordshire (GB)

(73) Assignee: MIPS Tech, LLC, Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/467,073

(22) Filed: Mar. 23, 2017

(65) Prior Publication Data

US 2017/0192779 A1    Jul. 6, 2017

Related U.S. Application Data

(63) Continuation of application No. 13/138,176, filed as application No. PCT/GB2010/000062 on Jan. 18, 2010, now Pat. No. 9,612,844.

(30) Foreign Application Priority Data

Jan. 16, 2009    (GB) .................................. 0900769.1

(51) Int. Cl.
G06F 9/50    (2006.01)
G06F 9/38    (2018.01)
G06F 9/30    (2018.01)

(52) U.S. Cl.
CPC .............. *G06F 9/3009* (2013.01); *G06F 9/38* (2013.01); *G06F 9/3802* (2013.01);
(Continued)

(58) Field of Classification Search
CPC .......... G06F 9/38; G06F 9/3851; G06F 9/3885
See application file for complete search history.

(56) References Cited

U.S. PATENT DOCUMENTS 4,862,407 A    8/1989 Fette et al.
5,487,022 A    1/1996 Simpson et al.
(Continued)

FOREIGN PATENT DOCUMENTS

GB    2311882 A1    10/1997
GB    2458487 A1    9/2009
(Continued)

OTHER PUBLICATIONS

AltiVec Technology Programming Environments Manual, Feb. 2002, Freescale Semiconductor, Rev. 2.0, 370 pages, [retrieved from the internet on Mar. 23, 2018], retrieved from URL <www.lri.fr/~lacas/ComputerArchitecture/Altivec_PEM.pdf>.*
(Continued)

*Primary Examiner* — Jyoti Mehta
(74) *Attorney, Agent, or Firm* — Adams Intellex, PLC

(57) ABSTRACT

A method and apparatus are provided for executing instructions of a multi-threaded processor having multiple hardware threads with differing hardware resources comprising the steps of receiving a plurality of streams of instructions and determining which hardware threads are able to receive instructions for execution, determining whether a thread determined to be available for executing an instructions has the hardware resources available required by that instructions and executing the instruction in dependence on the result of the determination.

17 Claims, 5 Drawing Sheets

(52) U.S. Cl.
CPC .......... *G06F 9/3822* (2013.01); *G06F 9/3836* (2013.01); *G06F 9/3851* (2013.01); *G06F 9/3885* (2013.01); *G06F 9/5011* (2013.01); *G06F 2209/507* (2013.01)

(56) References Cited

U.S. PATENT DOCUMENTS

| | | | |
|---|---|---|---|
| 7,007,153 | B1 | 2/2006 | Berenbaum et al. |
| 7,117,389 | B2* | 10/2006 | Luick .................. G06F 11/2028 714/11 |
| 2003/0172250 | A1 | 9/2003 | Fetzer et al. |
| 2004/0030864 | A1* | 2/2004 | Webber ................. G06F 9/3017 712/205 |
| 2005/0021931 | A1 | 1/2005 | Anderson et al. |
| 2005/0097552 | A1 | 5/2005 | O'Connor et al. |
| 2005/0283588 | A1 | 12/2005 | Yamashita |
| 2006/0101241 | A1 | 5/2006 | Curran et al. |
| 2006/0288244 | A1 | 12/2006 | Cai et al. |
| 2008/0077928 | A1* | 3/2008 | Matsuzaki ............ G06F 9/5044 718/104 |
| 2008/0128503 | A1 | 6/2008 | Moore et al. |
| 2008/0163230 | A1 | 7/2008 | Latorre et al. |
| 2009/0037911 | A1* | 2/2009 | Ahuja .................. G06F 9/5044 718/100 |
| 2010/0077185 | A1 | 3/2010 | Gopalan et al. |
| 2011/0161632 | A1 | 6/2011 | Sha et al. |

FOREIGN PATENT DOCUMENTS

| | | |
|---|---|---|
| WO | 9914666 A2 | 3/1999 |
| WO | 2004012079 A1 | 2/2004 |
| WO | 2007130798 A1 | 11/2007 |

OTHER PUBLICATIONS

Copies of NPL in parent.

CS2 Computer Systems note 12 Pipelined processors, Mar. 12, 2004, 6 pages, [retrieved from the internet on Jun. 6, 2015],retrieved from URL <http://www.inf.ed.ac.uk lteaching/courses/cs2/LectureNotes/CS2Ah/CompSys/12.pdf>, Submitted in U.S. Appl. No. 13/138,176 (Webber), entitled "Scheduling Execution of Instructions on a Processor Having Multiple Hardware Threads with Different Execution Resources," filed Sep. 20, 2011.

Hennessy et al., Computer Architecture a Quantitative Approach, 2nd Edition, 1996. p. 134, Submitted in U.S. Appl. No. 13/138,176 (Webber), entitled "Scheduling Execution of Instructions on a Processor Having Multiple Hardware Threads with Different Execution Resources," filed Sep. 20, 2011.

Moyer, "Threading the Needle: Imagination's META Processor Gets Clever with Threads," www.leavcom.com/imgtec_021710.php, Feb. 17, 2010, pp. 1-5, Submitted in U.S. Appl. No. 13/138,176 (Webber), entitled "Scheduling Execution of Instructions on a Processor Having Multiple Hardware Threads with Different Execution Resources," filed Sep. 20, 2011.

* cited by examiner

SCHEDULING EXECUTION OF INSTRUCTIONS ON A PROCESSOR HAVING MULTIPLE HARDWARE THREADS WITH DIFFERENT EXECUTION RESOURCES

FIELD OF THE INVENTION

This invention relates to a method for constructing a multi-threaded data, processor with multiple hardware threads, and to a method and apparatus for executing instructions on a multi-threaded micro-processor.

BACKGROUND OF THE INVENTION

Our British Patent No. 2311882, the contents of which are incorporated herein by reference describes a multi-threaded processor system.

This earlier patent describes a system with multiple hardware threads which also incorporate co-processor ports. In that system all the threads are homogenous in that they all have the same set of capabilities and the same resources available to them. Various processors build upon the foundation of this system by altering the processor so that it acts like most regular RISC processors but also incorporates features common to DSP processors.

Shown in FIG. 1 is a multi-threaded microprocessor core of the type described in GB2311882. This microprocessor consists of a number of arithmetic pipelines (e.g. data units (5) and address units (4)) along with an instruction scheduler capable of issuing to these pipelines from one of a number of threads where a thread is a separate stream of instructions running on a set of common hardware. Of particular note is the fact that threads do possess some separate resources—most importantly each thread possesses a set of registers all to itself.

In general when making a device with multiple threads it will be the case that the circuit for one thread is designed and then this circuit is replicated for all of the other threads. Circuits of interest include the thread instruction fetch, decode and scheduling materials denoted by (2) on the Figure and the implementation of the registers noted in the address (4) and data units (5).

SUMMARY OF THE INVENTION

Embodiments of one aspect of the invention address the problem of building a microprocessor with multiple-threads where the intended application does not require that all of the threads have all of the same capabilities. It provides a system in which it is possible to add and remove hardware to individual hardware threads while still being able to allow these threads to co-exist in a unified processor architecture.

Out of the box it is most obvious (and normal) to design a multi-threaded processor such as with all the hardware threads exactly the same. However, in many processors different threads do different things and some threads have to do more than others. For example, one thread may do the bulk of the work while another has a lighter load handling the management of the display pipeline.

Some threads may require more processing capability than others. For example, when making a DAB radio System on Chip (SoC) some threads may be running the DSP needed to decode the radio or audio signals whereas other threads may be running the user interface. Therefore, if the gates associated with a thread are optimised, both the area and power requirements of the hardware block can be optimised.

In addition to trimming existing threads down to a set of minimum hardware requirements it is also desirable to extend some threads beyond the capabilities of the rest of the system. For example, a thread may be required to support a different instruction set or an instruction set from an entirely different microprocessor altogether (e.g. x86, ARM, etc.).

So, from a given starting point where all threads have a set capability it may be the case that we want to make some threads less capable to reduce their area or that we want to make other threads more capable (than the starting position).

In accordance with embodiments of the invention a microprocessor can be built with multiple hardware threads but not all of these hardware threads have to be the same so some may have different instruction sets, register sets or other capabilities. This is a step beyond building multiple threads into a single processor core and does lead to both a reduction in hardware and/or an addition of hardware, as appropriate.

When making a thread less capable than its full-thread starting position the removed hardware will typically be thread-specific registers and some large segments of instruction decoders, etc. However, hardware will also need to be added to detect if software that was allowed on full thread hardware is now illegal because it uses features that the cut-down thread does not incorporate. To detect these errors additional hardware needs to be added to the instruction decoder to detect instructions that are not supported by this thread. This hardware will then need to raise an exception that can be handled by the software such that the operating system or software-stack can take an appropriate action. Appropriate actions include indicating that the instruction is now illegal on this thread in software alone and sending back an error code to a debugger to inform the author of the software that it cannot be run on this thread.

For example two sorts of threads have been used in different SoCs. These types of thread are 'DSP' and 'general-purpose'. In a processor capable of running DSP and/or RISC (Reduced Instruction Set Computer) instructions a 'DSP' thread is the full-thread example that is capable of running both sorts of instructions whereas a 'general-purpose' thread is the cut-down thread that is only allowed to run the RISC instruction set. Therefore, the 'general-purpose' threads have hardware added to their instruction decoders to detect when the thread attempts to use a DSP feature and raise an exception in response to this attempt.

In the first instance the desire is to reduce the overall silicon area of a multi-threaded microprocessor by reducing the area of some of the threads. A large part of a thread's area is its register set—the set of registers that may be referred to in a program or used by its compiler. It is very simple to choose to build a register file for a thread with half of the registers, however, this leaves some problems to be addressed if for example a program is executed on a thread that no longer fits in the available register set. These problems lead to the addition of circuitry for these reduced area threads that detect programs that don't fit within the available resources and raise exceptions for these programs.

DETAILED DESCRIPTION OF A PREFERRED EMBODIMENT

A data management system such as a microprocessor may optionally support more than one stream of instructions running on the same hardware. Such a system is deemed to be 'multi-threaded'. An example of such a system is shown in FIG. 1, referred to above.

Figure 1:
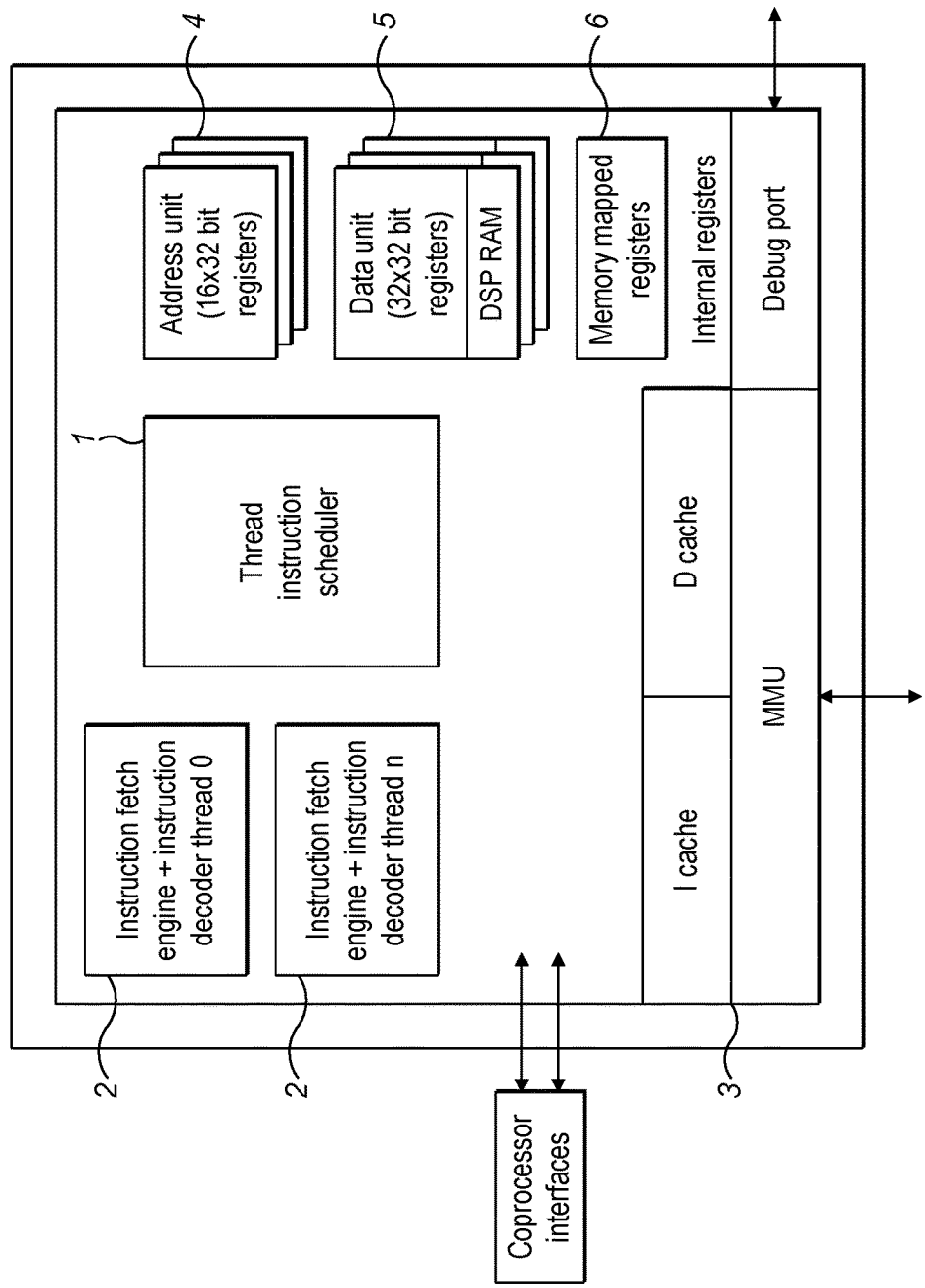
FIG. 1 as discussed above shows a block diagram of a multi-threaded processor.

As shown in FIG. 1 such a system consists of one or more instruction fetch and decode units 2, a single common instruction scheduler 1 that chooses from among the multiple-thread's instructions, a number of possible execution units 4 and 5 (e.g. address units, data units) and, perhaps, one or more caches. Typically such a system will be split into common logic—e.g. execution units—and per-thread logic—e.g. register set. Because much of the logic, such as execution pipelines, is shared the most obvious arrangement of threads is that they are all built from the same logic. Here we address the problem of allowing different threads within such a machine to be built from different logic and therefore be capable of different levels of functionality.

Basically, the processor consists of an instruction scheduler (1) that arbitrates between all of the different hardware threads in the system (2). These instructions target a number of common resources such as caches and MMUs (3), execution units (4 and 5) and registers (6). If this processor supports DSP operations DSP features such as embedded DSP RAM and accumulators will be built into the execution units (5).

Figure 2:
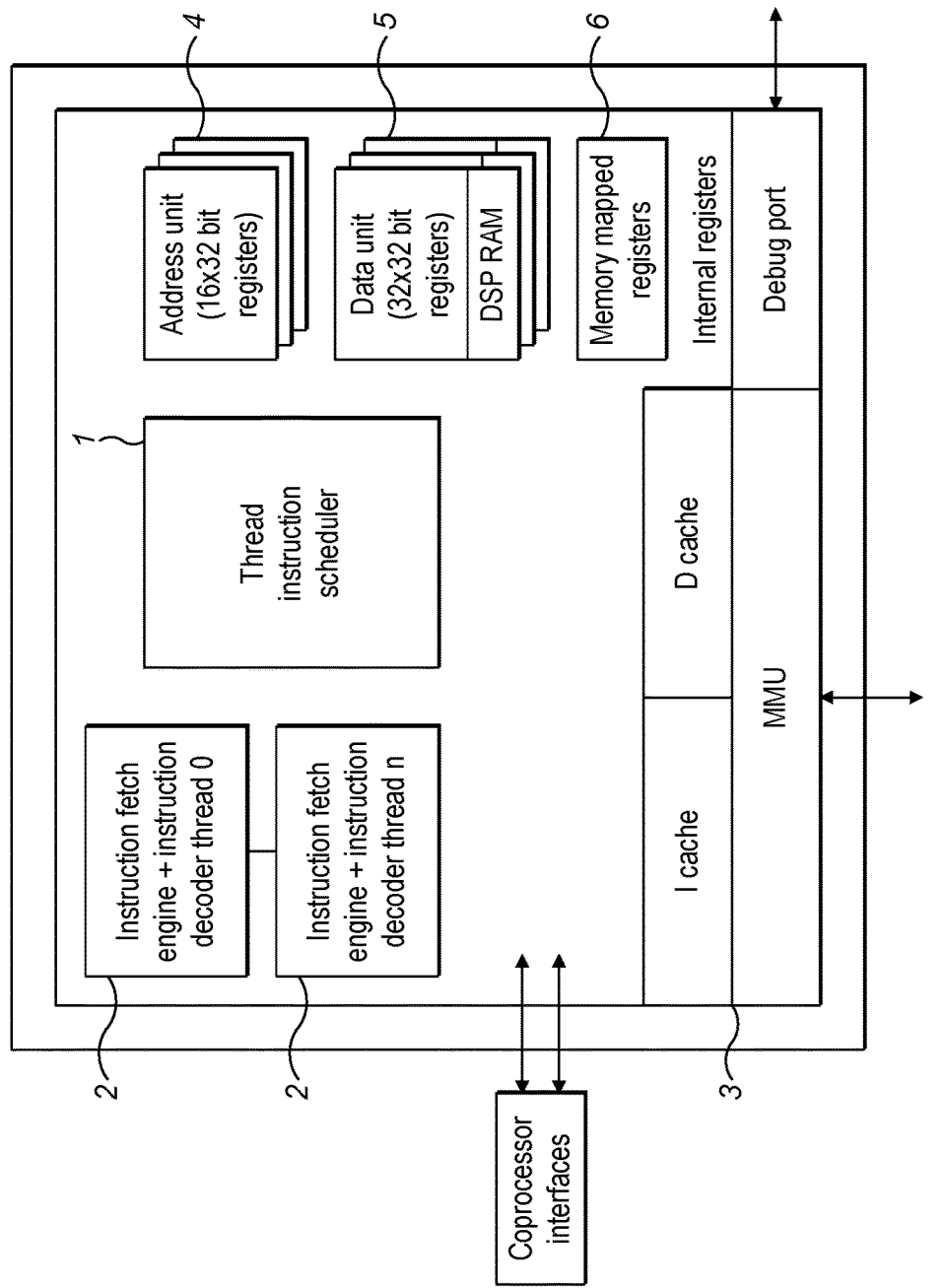
FIG. 2 shows a further block diagram of a multi-threaded processor.
Figure 3:
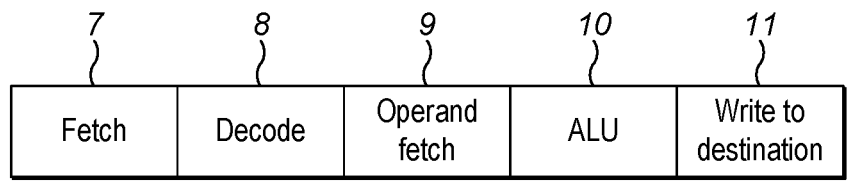
FIG. 3 shows the various functions which pass through an instruction pipeline for an instruction.

A multi-threaded data management system as shown in FIG. 1 will normally have one or more pipelines through which all instructions travel, an example of such a pipeline is shown in FIG. 3. The first stages of this are instruction fetch 7 and then instruction decode 8, and these are performed by the instruction fetch and decode units 2 of FIG. 2. There then follows an operand fetch 9, an ALU processing of the instruction 10 and then the step of writing to a destination 11.

In this embodiment of the invention the system incorporates a number of execution units each of which incorporates certain thread-specific features (e.g. the microprocessor registers for a given thread) as well as certain thread-common features (e.g. shared registers and the execution unit ALU itself). An example of an execution unit is shown in FIG. 4.

Figure 4:
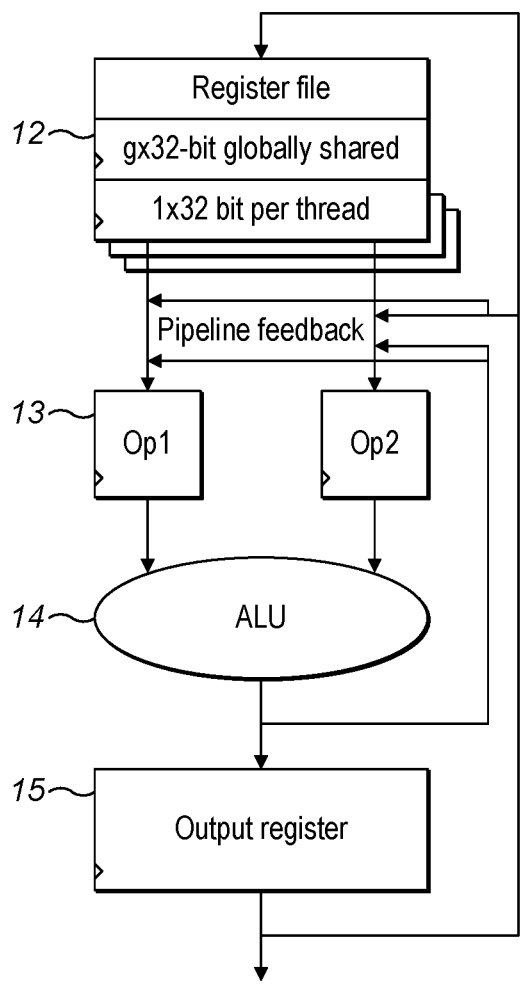
FIG. 4 shows a block diagram of an execution unit on a thread.

As can be seen from FIG. 4 the execution unit is pipelined such that items 13, 14 and 15 in FIG. 4 bear a relationship to the pipeline stages respectively marked as 9, 10 and 11 in FIG. 3. In addition it can be seen that the execution unit includes a localised register file 12 associated with an ALU pipeline. The register file consists of a number of registers globally shared by all of the threads (g) and a number of thread specific registers (t). In this embodiment of the invention the number of registers per-thread may be completely different on different threads. In addition, as shown in item 5 in FIG. 2 the embodiment of this invention may support both normal microprocessor capabilities and DSP capabilities. This embodiment incorporates the idea of different capabilities with regards to access to base and DSP features.

A multi-threaded microprocessor consists of a common platform, such as arithmetic pipelines and perhaps a cache infrastructure in combination with a set of thread specific resources. In the first place each thread requires a means for obtaining instruction data to present to the shared instruction scheduler. This consists of an engine to fetch instructions from cache or embedded memory which is followed by instruction decode hardware. In the specific example being considered here the instruction decode is split into two parts—pre-decode and post-decode. The instruction pre-decode is concerned with examining the next instruction to determine what resources it requires. This list of resources can be matched against the list of resources available on each hardware thread on any given cycle to determine if a thread is suitable for execution on that cycle. Instruction post-decode can work with instructions that have been marked for issue to form control structures suitable for sending to each of the possible target units.

Multi-threaded instruction scheduling works by obtaining information from each instruction thread as to whether it may issue an instruction or not on a given cycle and then picking a lead issuer based on any one of a number of rules with the simplest being a round-robin arbitration, and the most complex being dynamically prioritisation. Part of this arrangement is shown in FIG. 5.

Figure 5:
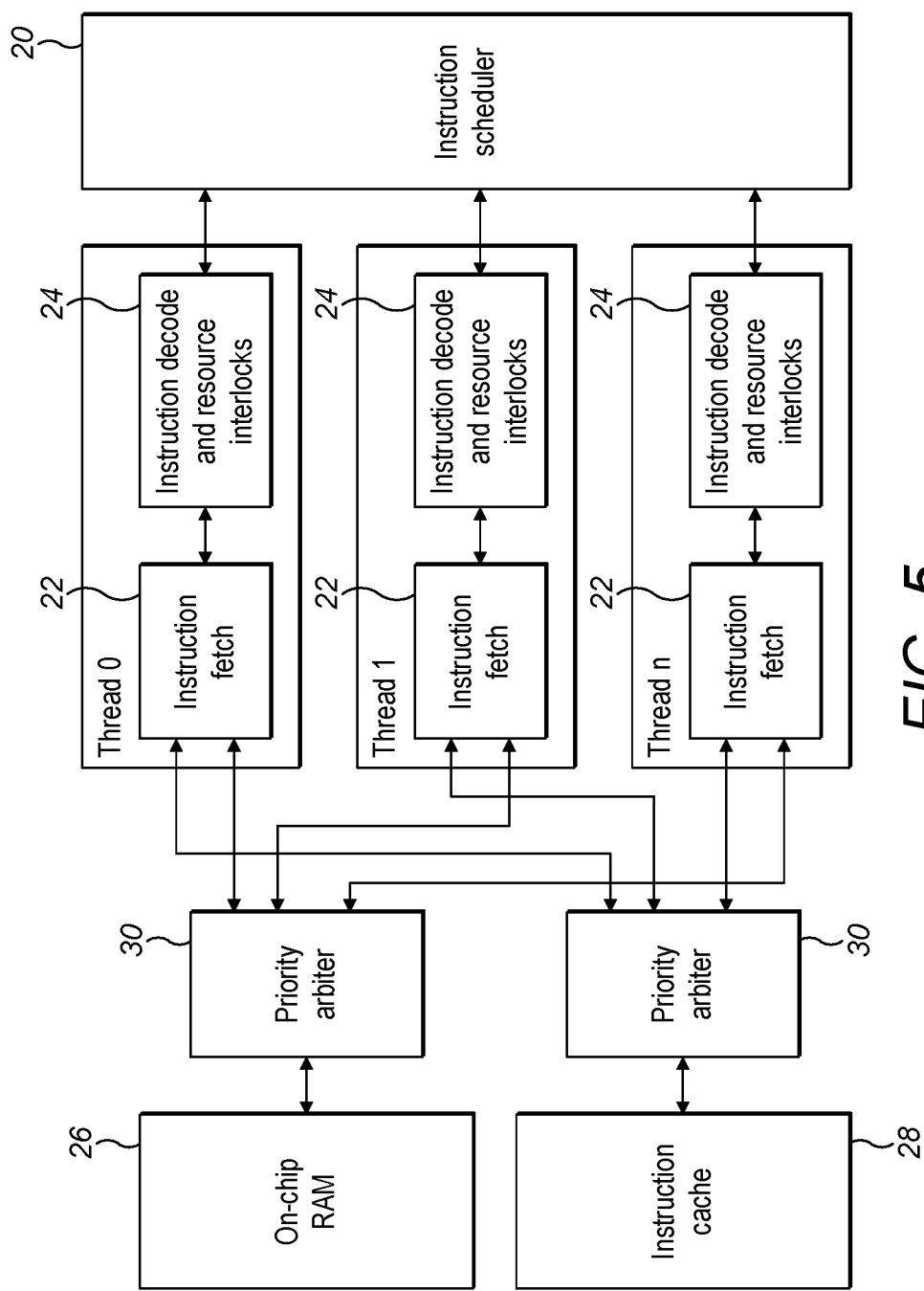
FIG. 5 shows a block diagram of an instruction scheduler and the connections thereto.

FIG. 5 shows an instruction scheduler 20 receiving instructions from three threads, thread 0, 1, and n.

Instructions for the various threads are fetched by instruction fetch units 22 and sent by instruction decoder and resource interlocks 24 to the instruction scheduler 20. Instructions are fetched from instruction RAM 26 and from an instruction cache 28 using priority arbiters 30.

The main aim is to be able to scale the size of a specific thread to match the resources it requires to perform the tasks for which it is to be used. For example, one thread in a complex system may be involved in running an operating system, while another may be concerned with interacting with the user and another may be concerned with managing some hardware resource or interface.

Savings can be made if threads can be fit to their purposes. If, for example, one thread is running a DSP algorithm such as the decode of some compressed audio data it may need to use all of the DSP features of the microprocessor, whereas if a thread is running the operating system or dealing with the user it may only need to run general purposes 'C' programs and will never need to use any of the DSP resources of the device. In this situation it will be possible to scale the hardware resources available to a thread to match its needs. For example, a DSP thread could be allowed extra registers in its register (t) files to allow the DSP programmer to maintain more data items in flight at any one time (via software pipelining), also, as can be seen from FIG. 1 a DSP thread may have extra resource such as DSP RAM.

It is important to appreciate that it is not enough just to scale these sorts of resources and build the device. A multi-threaded microprocessor is designed such that the each thread has its own program counter from which it fetches instructions to be run. If a non DSP thread has its program counter pointed at a DSP program the program is likely to not operate correctly because the thread does not have all the resources necessary to run the program.

Figure 6:
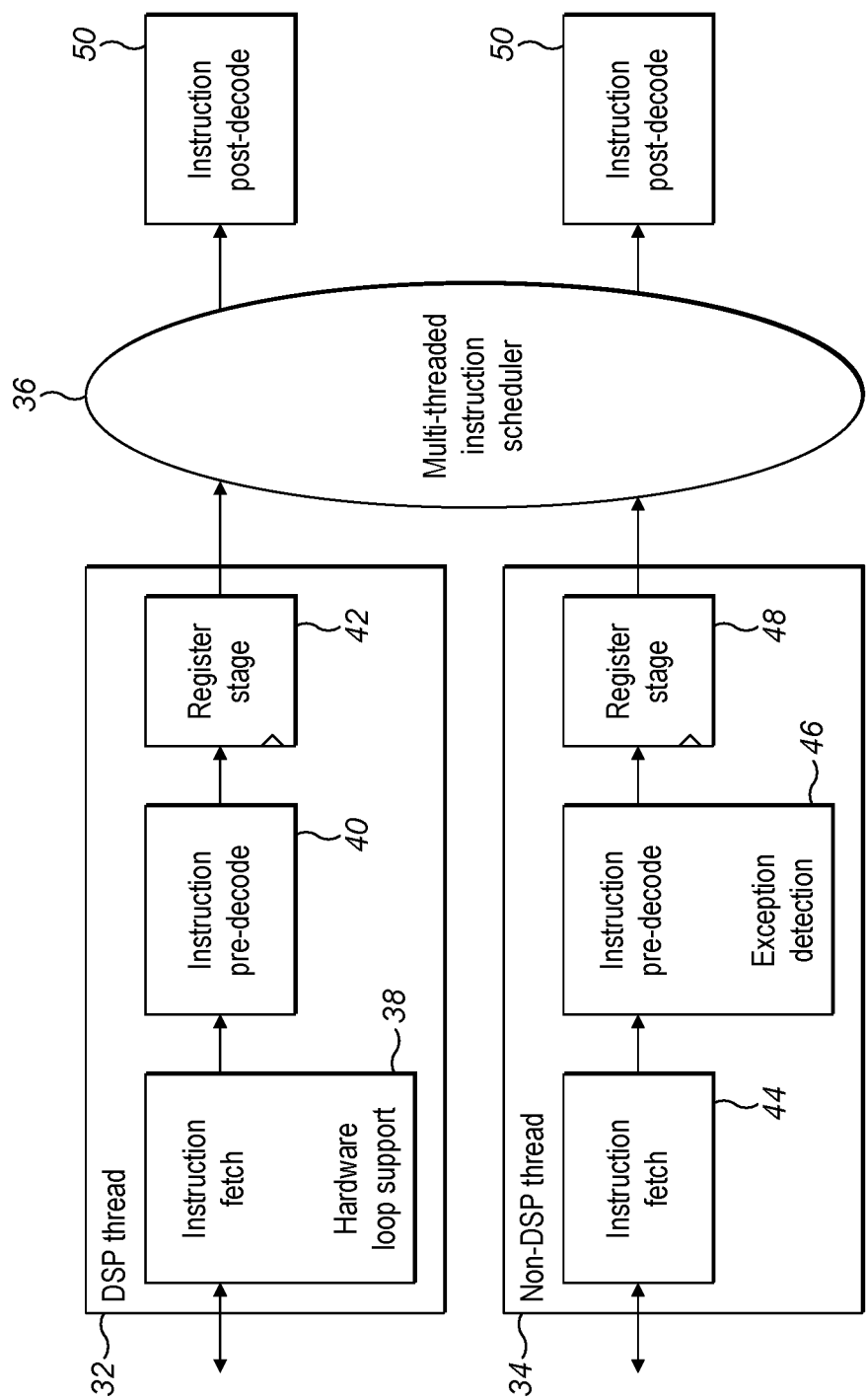
FIG. 6 shows an example of hardware differences required to support threads of different capabilities in an embodiment of the invention.

The hardware differences required to support threads of differing capabilities are shown in FIG. 6.

This shows a DSP thread and a non DSP thread. The DSP thread 32 and the non DSP thread 34 are in parallel providing instructions to a multi-threaded instruction scheduler 36.

The DSP thread 32 has an instruction fetch unit 38 which includes hardware loop support. This provides instructions to an instruction pre-decode unit 40 which then passes them to a registered stage 42 and then to the multi-threaded instruction scheduler 36. The non DSP thread 34 has a similar instruction fetch unit 44 but without the hardware loop support. This provides instructions to an instruction pre-decode unit 46 which includes exception detection to determine whether or not instructions may be executed on that thread, and then sends the decoded instructions, if appropriate, to a registered stage 48 from where they may be provided to the multi-threaded instruction scheduler 36. Instructions which pass through the scheduler of 36 pass to instruction post-decode units 50. As can be seen from FIG. 6 the first essential change is that a non-DSP thread needs extra pre-decode circuitry to detect instructions that are not supported by this thread as this thread does not have the requisite resources. For example, an instruction may require the use of DSP RAM which is not available to this thread, alternatively a program may require an extended register set. In these cases if a program to be run on a non-DSP thread includes these features it will generate a flag in pre-decode via the exception detection unit that indicates that the instruction is illegal and should not be run.

This illegal instruction flag will be passed through the decode register stage and indicates to the instruction scheduler that this thread is not available for running this cycle after which either the thread will be turned off (disabled), or an interrupt will be raised for an illegal instruction which will then allow software to determine the cause of the error and take whatever action is most applicable. In the most extreme example a non-DSP thread could emulate the capabilities of a DSP thread by running extra instructions and using memory in place of the register or DSP RAM resources expected of a DSP thread. This would not be the most common approach as it is very inefficient to run a DSP program this way when compared to running it on a DSP thread directly.

It may also be noted from FIG. 6 that the hardware for non-DSP threads in the instruction fetch and decode arena may also be optimised for area. In this case it is possible to remove the hardware that is used to automatically fetch hardware loops for a DSP thread as it can be classed as part of the DSP feature set that is not supported on this thread. Typically, this type of feature requires area for loop addresses and loop counts along with logic to manage the instruction fetch and decrement the count as the loop is serviced.

In the arithmetic pipelines themselves the capabilities of each thread may be used to determine what resources to build for each thread. As an example, a differently sized register file may be built for DSP and non-DSP threads (in each of the diverse arithmetic pipelines), also, DSP specific features such as DSP RAM and wide accumulator registers may be built only for the necessary threads with other threads always returning a fixed data pattern such as zero from these areas.

The specific example given is for a system that is capable of both DSP and RISC features, with some threads being shrunk by removing DSP features. An alternative is to consider the possibility that different threads may be capable of diverse instruction sets. For example, it is common for 32-bit RISC microprocessors to augment their instruction set with a shorter alternative as this allows a program to be compressed to fit into a smaller amount of memory. However, adding support for an alternative instruction set can require a different instruction fetch strategy and may entail more area for a thread due to extra instruction decode stages to form larger instructions from several smaller ones. In this case it may be desirable to make the ability to support the smaller instruction set an option that can be controlled so that the area of a device can be tailored to its intended application.

A further extension of this idea is that a thread can be running an entirely different instruction set. For example, one thread can be running the native instruction set for a microprocessor while another thread can use an entirely different instruction set—for example, one tailored to running JAVA™ byte codes on the given machine architecture.

Also, beyond the DSP/non-DSP capabilities given in the example other areas of hardware can be made thread specific. If a microprocessor incorporates floating point hardware this can be made optional on a thread-by-thread basis. Again this would be done partly for area, however, in this case the floating point hardware may be more complicated that the existing arithmetic leading to a lower clock speed if used. Possibly if a thread does not have access to floating point hardware its clock speed can be maintained and remain higher than comparable threads which allow hardware floating point.

What is claimed is:

1. A method for executing instructions on a multi-threaded processor having a plurality of hardware threads, the method comprising:
   fetching an instruction for execution on the multi-threaded processor from each of a plurality of streams of instructions;
   receiving each instruction of the fetched instructions at a pre-decode unit of a respective one of the plurality of hardware threads of the multi-threaded processor;
   in parallel at the pre-decode units of the plurality of hardware threads, detecting whether each instruction of the fetched instructions requires a resource that is not available at the respective one of the plurality of hardware threads;
   responsive to detecting that an instruction requires a resource that is not available at the respective one of the plurality of hardware threads, the respective pre-decode unit indicating to an instruction scheduler that the instruction requiring the resource is not to be executed at the respective one of the plurality of hardware threads, wherein the multi-threaded processor comprises the instruction scheduler; and
   at the instruction scheduler, which is configured to schedule instructions for execution at the plurality of hardware threads, not scheduling the instruction requiring the resource for execution at the respective one of the plurality of hardware threads,
   wherein the multi-threaded processor has a register file with a number of registers shared by the plurality of hardware threads and a number of thread-specific registers.

2. The method according to claim 1 in which the detecting whether each instruction of the fetched instructions requires a resource that is not available at the respective one of the plurality of hardware threads is performed in each clock cycle.

3. The method according to claim 1 wherein the indicating to an instruction scheduler that the instruction requiring the resource is not to be executed at the respective one of the plurality of hardware threads comprises generating a flag.

4. The method according to claim 3 wherein the flag is generated by the respective pre-decode unit.

5. The method according to claim 1 wherein the plurality of hardware threads do not provide DSP resources and the multi-threaded processor comprises one or more additional hardware threads each providing DSP resources.

6. The method according to claim 1 wherein the plurality of hardware threads do not provide an extended register set and the multi-threaded processor comprises one or more additional hardware threads each providing an extended register set.

7. The method according to claim 1 wherein the register file is associated with an arithmetic-logic unit (ALU) pipeline.

8. The method according to claim 7 wherein a first thread is associated with a lower number of registers than a second thread.

9. The method according to claim 1 wherein the instruction scheduler is multi-threaded.

10. A multi-threaded processor, comprising:
a plurality of hardware threads each comprising a respective set of resources, the sets of resources of a first set of hardware threads each including a resource that is not included in the sets of resources of a second set of hardware threads; each of the second set of hardware threads comprising:
an instruction fetch unit configured to fetch instructions for execution on the multi-threaded processor from a respective stream of instructions; and
a pre-decode unit configured to, in parallel with pre-decode units of other threads, detect whether each fetched instruction requires a resource that is not available at the respective hardware thread; and
an instruction scheduler circuit configured to, in response to a pre-decode unit detecting that an instruction requires a resource that is not available at the respective hardware thread, not schedule the instruction requiring the resource for execution at the respective hardware thread, wherein the multi-threaded processor comprises the instruction scheduler,
wherein the multi-threaded processor has a register file with a number of registers shared by the plurality of hardware threads and a number of thread-specific registers.

11. The multi-threaded processor according to claim 10 wherein the predecode units of the second set of hardware threads detect whether each fetched instruction requires a resource that is not available at the respective hardware thread on each clock cycle.

12. The multi-threaded processor according to claim 10 wherein the pre-decode units of the second set of hardware threads are configured to indicate to the instruction scheduler circuit when a fetched instruction requires a resource that is not available at the respective hardware thread.

13. The multi-threaded processor according to claim 12 wherein the indication is a flag.

14. The multi-threaded processor according to claim 10 wherein instruction fetch units in the first set of hardware threads comprises a hardware loop counter and the instruction fetch units in the second set of hardware threads do not comprise a hardware loop counter.

15. The multi-threaded processor according to claim 10 wherein the set of resources of at least one of the first set of hardware threads comprises an accumulator register that is wider than registers in the sets of resources of the second set of hardware threads.

16. The multi-threaded processor according to claim 10 wherein the first set of hardware threads provide DSP resources and the second set of hardware threads do not provide DSP resources.

17. The multi-threaded processor according to claim 10 wherein the first set of hardware threads provide an extended register set and the second set of hardware threads do not provide an extended register set.

* * * * *